(12) United States Patent
Lau et al.

(10) Patent No.: US 10,891,727 B2
(45) Date of Patent: Jan. 12, 2021

(54) AUTOMATED AIRFIELD GROUND LIGHTING INSPECTION SYSTEM

(71) Applicants: Airport Authority, Lantau (HK); D2V Limited, Shatin (HK)

(72) Inventors: Tak Kit Lau, Shatin (HK); Kai Wun Lin, Shatin (HK); Pong Mau Ng, Lantau (HK); Kai To Wong, Lantau (HK)

(73) Assignees: Airport Authority, Lantau (HK); D2V Limited, Shatin (HK)

( * ) Notice: Subject to any disclaimer, the term of this patent is extended or adjusted under 35 U.S.C. 154(b) by 155 days.

(21) Appl. No.: 16/099,663

(22) PCT Filed: Nov. 29, 2017

(86) PCT No.: PCT/IB2017/057474
§ 371 (c)(1),
(2) Date: Nov. 7, 2018

(87) PCT Pub. No.: WO2018/116032
PCT Pub. Date: Jun. 28, 2018

(65) Prior Publication Data
US 2019/0156473 A1     May 23, 2019

(30) Foreign Application Priority Data
Dec. 19, 2016  (HK) .................................. 16114414

(51) Int. Cl.
*G06K 9/00* (2006.01)
*G06T 7/00* (2017.01)
(Continued)

(52) U.S. Cl.
CPC ................ *G06T 7/001* (2013.01); *F21S 8/00* (2013.01); *G06K 9/00637* (2013.01);
(Continued)

(58) Field of Classification Search
CPC ..... F21S 8/00; G06K 9/00637; G06K 9/4604; G06T 7/001; G06T 7/008; G06T 7/74;
(Continued)

(56) References Cited

U.S. PATENT DOCUMENTS

2003/0044048 A1*  3/2003  Zhang ....................... G06T 7/80
                                                             382/107
2009/0177426 A1    7/2009  Dodds et al.
(Continued)

FOREIGN PATENT DOCUMENTS

CN      102821524 A      12/2012
CN      103116140 A       5/2013
(Continued)

OTHER PUBLICATIONS

Dasqupta et al. ("Pattern tracking and 3-D motion reconstruction of a rigid body from a 2-D image sequence," IEEE Transactions on Systems, Man, and Cybernetics, vol. 35 , Is. 1 , Feb. 2005) (Year: 2005).*

(Continued)

*Primary Examiner* — Yubin Hung
(74) *Attorney, Agent, or Firm* — Suiter Swante pc llo

(57) ABSTRACT

An automated airfield ground lighting inspection system and method is disclosed.
An image acquisition means captures image streams of the airfield ground lighting system lights when moved across an airfield. A location sensor detects positional information for the image acquisition means when capturing the plurality of images comprising the image streams. An image processor coupled to the image acquisition means and the location sensor processes the image stream of a light of the airfield ground lighting system by:
(a) associating characteristics of a plurality of points in an image with an item in the light to be checked, and using this association for extraction of the points;

(Continued)

(b) verifying each extracted point; and
(c) determining the state of the light of the image stream by processing the verified extracted points comprising an item to be checked.

7 Claims, 10 Drawing Sheets

(51) Int. Cl.
*G06T 7/73* (2017.01)
*H04N 5/225* (2006.01)
*F21S 8/00* (2006.01)
*G06K 9/46* (2006.01)
*H04N 7/18* (2006.01)

(52) U.S. Cl.
CPC .......... *G06K 9/4604* (2013.01); *G06T 7/0008* (2013.01); *G06T 7/73* (2017.01); *G06T 7/74* (2017.01); *H04N 5/2252* (2013.01); *H04N 7/185* (2013.01); *G06T 2207/10032* (2013.01); *G06T 2207/10152* (2013.01); *G06T 2207/20072* (2013.01); *G06T 2207/20081* (2013.01); *G06T 2207/30184* (2013.01); *G06T 2207/30244* (2013.01)

(58) Field of Classification Search
CPC . G06T 2207/30244; G06T 2207/20081; G06T 2207/10152; G06T 2207/30184; G06T 2207/20072; G06T 2207/10032; G06T 7/73; H04N 7/185; H04N 5/2252
See application file for complete search history.

(56) References Cited

U.S. PATENT DOCUMENTS

| | | | |
|---|---|---|---|
| 2013/0163815 A1* | 6/2013 | Mai | G06T 7/20 382/103 |
| 2014/0055614 A1* | 2/2014 | Kahan | G08G 1/166 348/148 |
| 2016/0171303 A1* | 6/2016 | Moore | G06T 7/70 382/153 |
| 2016/0292518 A1 | 10/2016 | Banitt et al. | |
| 2017/0185823 A1* | 6/2017 | Gold | G06F 16/5838 |
| 2019/0147219 A1* | 5/2019 | Thornbrue | G06K 9/00208 348/169 |

FOREIGN PATENT DOCUMENTS

| | | |
|---|---|---|
| CN | 104105640 A | 10/2014 |
| CN | 205003546 U | 1/2016 |
| CN | 105578675 A | 5/2016 |
| EP | 1366989 B1 | 8/2013 |
| EP | 3096286 A1 | 11/2016 |
| JP | H07329895 A | 12/1995 |
| JP | 2005275723 A | 10/2005 |
| WO | WO2015157715 A1 | 10/2015 |

OTHER PUBLICATIONS

PCT Search Report (PCT/ISA/210) and Written Opinion of the International Searching Authority (PCT/ISA/237) by the ISA International Bureau dated Mar. 7, 2018 for PCT application No. PCT/IB17/57474 filed Nov. 29, 2017 and published as WO 2018/116032 dated Jun. 28, 2018.
Examination Report dated Aug. 21, 2019 for Australian Patent Application No. 2017381620.
Examination Report dated Nov. 26, 2019 for Canadian Patent Application No. 3,023,398.
Glenn J et al, Calibration and Use of Camera-Based Systems for Road Lighting Assessment, International Journal of Lighting Research and Technology, Division, London, Printed in Great Britain, vol. 32, No. 1, Jan. 1, 2000, pp. 33-40, XP009073321, ISSN: 1365-7828, DOI: 10.1177/096032710003200105.
Koch Christian et al., A review on computer vision based defect detection and condition assessment of concrete and asphalt civil infrastructure, Advanced Engineering Informatics, Elsevier, Amsterdam, NL, vol. 29, No. 2, Feb. 21, 2015, pp. 196-210.
McMenemy K et al, Calibration and use of video cameras in the photometric assessment of aerodrome ground lighting, Proceedings of SPIE, IS & T, IEEE, US, vol. 5017, Jan. 1, 2003, pp. 104-115, 12 pages.
Peng J-X et al, Fast model-based feature matching technique applied to airport lighting, IET Science, Measurement and Technology, vol. 2, No. 3, May 1, 2008, pp. 160-176.
Shyama Prosad Chowdhury et al, Performance Evaluation of Airport Lighting Using Mobile Camera Techniques, Sep. 2, 2009, Computer Analysis of Images and Patterns, Springer Berlin Heidelberg, Berlin, Heidelberg, pp. 1171-1178.
Supplementary Partial European Search Report for European Application No. 17882651 dated Jun. 24, 2020.
Extended European Search Report dated Sep. 28, 2020 for EP Application No. 17882651.7.
Peng, Jian-Xun et al., "An Iterative Algorithm for Finding Point Correspondences", 2008 Congress on Image and Signal Processing, IEEE, May 27, 2008, pp. 441-447.

* cited by examiner

AUTOMATED AIRFIELD GROUND LIGHTING INSPECTION SYSTEM

FIELD

The present disclosure relates to an improved method, system and apparatus for automated inspection of airfield ground lighting.

BACKGROUND

Airfields are equipped with specialized lighting systems to provide guidance to planes taking off, landing and taxiing. The guidance system provided by airfield ground lighting (inset and elevated lights) is a particularly important visual aid in conditions of poor visibility arising from weather conditions or for low light conditions.

Airfield ground lighting is exposed to a harsh environment, with repeated contact with aircraft tires, ground vehicle tires and variable weather conditions, which can diminish the reliability and effectiveness of operation.

International Civil Aviation Organisation (ICAO) standards specify the importance of regular integrity checking of the airfield ground lighting in view of the frequent and significant impact with aircraft tires.

Photometric inspections of the airfield ground lighting may be conducted for example by using a mobile apparatus which is towed across the runway by a vehicle, to monitor the actual light beams emitted from the lights. However, in addition to the photometric inspection, it is also necessary to conduct regular checks of the lights to monitor such as missing or loosened bolts, or other components or cracks in the actual lights of the airfield ground lighting system.

Typically these checks are performed by closing the runway and manually viewing each and every light, either by having trained maintenance workers move along the lights by walking or with the assistance of a slow moving or frequently stopping vehicle. As can be appreciated, this manual inspection is laborious, time consuming and inefficient although at the same time critically important for ensuring the integrity and reliability of the lights.

However, with the increased aircraft passenger travel creating an increased number and frequency of flights and hence pressure on existing airfields, runway closures impact on the efficiency and profitability of airfield operation.

Accordingly the system and method of the present disclosure provide an alternative which addresses at least some of the above deficiencies.

SUMMARY

In a broad aspect of the present invention there is provided a method for training an airfield ground lighting inspection system comprising:

moving a housing having an image acquisition means attached thereto to capture image streams of a plurality of lights of an airfield ground lighting system, each image stream comprising successive images of a light;

using a location sensor to detect the positional information of the image acquisition means capturing the image streams;

processing the image streams to detect and associate a plurality of points in a specified arrangement in an image with an item to be checked, wherein the associating is performed by storing operator selection of a plurality of points in a sample image and a subsequent sample image from an image stream of a light of the airfield ground lighting system.

Advantageously, the operator specifies the location, orientation and region of the plurality of points in the sample image and subsequent sample image of the image stream.

The location in three dimensional space of the image acquisition means may be determined from the analysis of the point from a first sample image and at least one subsequent sample image and location information of the image acquisition means.

Optionally, the reference locations for the one or more points of the item of the light being checked of the images of the image stream may be determined from the depiction of those one or more points in the sample image and subsequent sample image.

Advantageously the reference location may be determined by epipolar geometry.

Optionally, for the images in the image stream after the sample image and subsequent image, the locations of the points of the item to be checked may be determined by:

detecting the locations of the scene points for the images of the sample image stream, wherein the locations of the scene points are the location of the points comprising the item to be checked relative to the three dimensional frame of reference of the light, projecting said scene points into the images of the sample image stream from the identified reference location for that scene point and from the location information of the image acquisition means, processing the images of the image stream to detect location of the points comprising the item to be checked, comparing the location of the projected scene point in the images with the location of the detected points in the images and calculating the proximity therebetween, verifying presence of a point in the item to be checked where the calculated proximity exceeds a threshold value.

The determination of the existence of points in an image may be made using a discriminative classifier. The location information may be derived from a group comprising a GPS sensor and light location data, where the location sensor may be a MEMS tri-axial inertial sensor.

In a further broad aspect the airfield ground lighting inspection system may comprise:

a housing having an image acquisition means attached thereto configured for capturing a plurality of image streams of a plurality of lights comprised in an airfield ground lighting system upon movement of the housing across the airfield;

a location sensor for detecting positional information for the image acquisition means capturing the plurality of images comprising the image streams;

an image processor coupled to the image acquisition means and the location sensor for processing the image stream of a light of the airfield ground lighting system by:

(a) associating characteristics of a plurality of points in an image with an item in the light to be checked, and using this association for extraction of the points from the images of an image stream;

(b) analysing a plurality of randomly selected pairs of sample images to determine a plurality of tentative reference locations for each extracted point relative to the three dimensional coordinate frame of the light;

(c) assessing the tentative reference locations determined for each extracted point, to determine a reference location for each extracted point;

(d) projecting each extracted point into the images of the image stream based upon the determined reference location and location information of the image acquisition means for each image;

(e) analysing the images of the image stream by comparing the location in the images of the extracted points and the projected points and calculating the proximity therebetween;

(f) verifying existence in an image of the point of item being checked by comparing the calculated proximity against a threshold value;

(g) repeating steps (a) to (f) to determine existence of each point in the plurality of points associated with an item to be checked; and (h) determining the state of the item to be checked based upon analysis of verified points.

In a further broad aspect an airfield ground lighting inspection system may comprise:

a housing having an image acquisition means attached thereto configured for capturing a plurality of image streams of a plurality of lights comprised in an airfield ground lighting system upon movement of the housing across the airfield;

a location sensor for detecting positional information for the image acquisition means capturing the plurality of images comprising the image streams;

an image processor coupled to the image acquisition means and the location sensor for processing the image stream of a light of the airfield ground lighting system by:

(a) associating characteristics of a plurality of points in an image with an item in the light to be checked, and using this association for extraction of the points from the images of an image stream;

(b) verifying each extracted point by comparing a projected location of that point based upon analysis of plurality of pairs of images with an extracted location of that point;

(c) determining the state of the light of the image stream by processing the verified extracted points comprising an item to be checked.

In the above aspects the points extracted in an image of the image stream are extracted using an algorithm that may be selected from the histogram of oriented gradient algorithm and normalised gradient analysis algorithm.

Associating of the plurality of points in an image with an item of the light depicted in that image to be checked may be performed by the above training method.

The items to be checked may be selected from the group including a bolt, a nut, a ring, an inset light and a crack, and the system may be configured to verify the presence of a crack.

Optionally, the system may be configured to verify in an image stream the absence of any one or more of a bolt, a nut, a ring, and an inset light.

Preferably the system is configured to verify in an image stream the orientation of any one or more of a bolt, a nut, a ring, an inset light and a crack.

The items to be checked may include predetermined markings at predetermined locations, which may be location data of a light relative to the airfield.

Optionally, the images may be acquired under ambient lighting conditions.

Alternatively, an additional illumination means is attached to the movable housing for lighting the lights for image acquisition.

A tentative reference location for a point in each pair of images analysed may be determined using the positional information of the image acquisition means for that pair of images and the detected location of that point in the pair of images.

BRIEF DESCRIPTION OF THE DRAWINGS

Preferred embodiments of the present disclosure will be explained in further detail below by way of examples and with reference to the accompanying drawings, in which.

DETAILED DESCRIPTION OF THE PREFERRED EMBODIMENTS

In a broad aspect of the present disclosure, there is provided an improved airfield lighting inspection system, which provides reliable, automated checking using image analysis of the lights in airfield ground lighting system.

Figure 1:
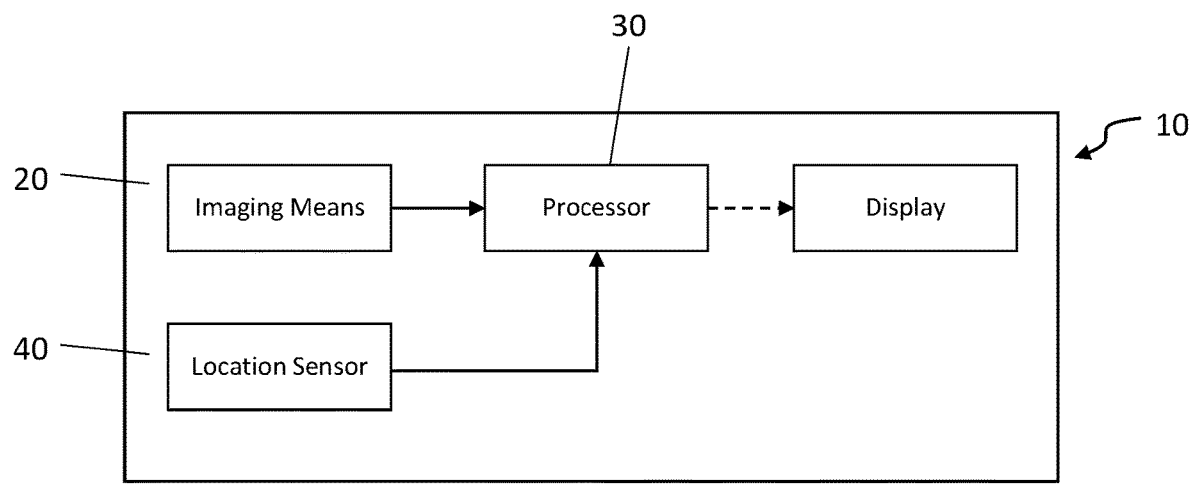
FIG. 1 shows a schematic view of an exemplary arrangement of an embodiment of the airfield ground lighting system of the disclosure.

Referring to FIG. 1, there is depicted a schematic representation of various components of the present disclosure.

The mobile platform 10 includes connected thereto a high speed imaging means 20. The high speed imaging means may be a high speed imaging camera or a plurality of cameras sensitive to the visible light spectrum (400 to 700 nanometres in wavelength). The high speed imaging means 20 is connected to a processor 30 which is configured to receive inputs from the location sensor 40 and the high speed imaging means 20.

The mobile platform may also include an illumination means (not shown) for increasing the amount of light provided to the subject in the field of view of the high speed imaging means.

Advantageously, the processor 30 is in communication with memory storage (not shown), which stores information such as location and feature information as is detailed further below.

The results from the image processing conducted on images acquired by the high speed imaging means 20 and analysed by the processor 30 based upon information provided by the location sensor 40 may be displayed on a display 50. Advantageously, the display 50 may be located on the mobile platform or may alternatively be remote from the system.

It would be appreciated that the actual processing of images may occur at a geographically remote location from the mobile vehicle, provided that the images and accompanying location information are indexed appropriately, without departing from the scope of the present invention.

Figure 2A:
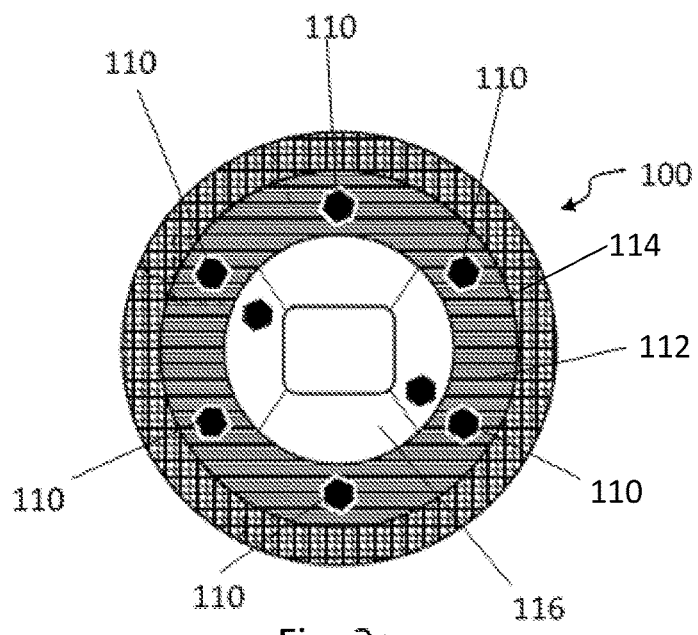
FIG. 2a shows an exemplary schematic view of a light of the airfield ground lighting system without defects.

Turning now to FIG. 2a, there is depicted an exemplary top view of one type of light in an airfield ground lighting system, in this case without any defects.

Figure 2B:
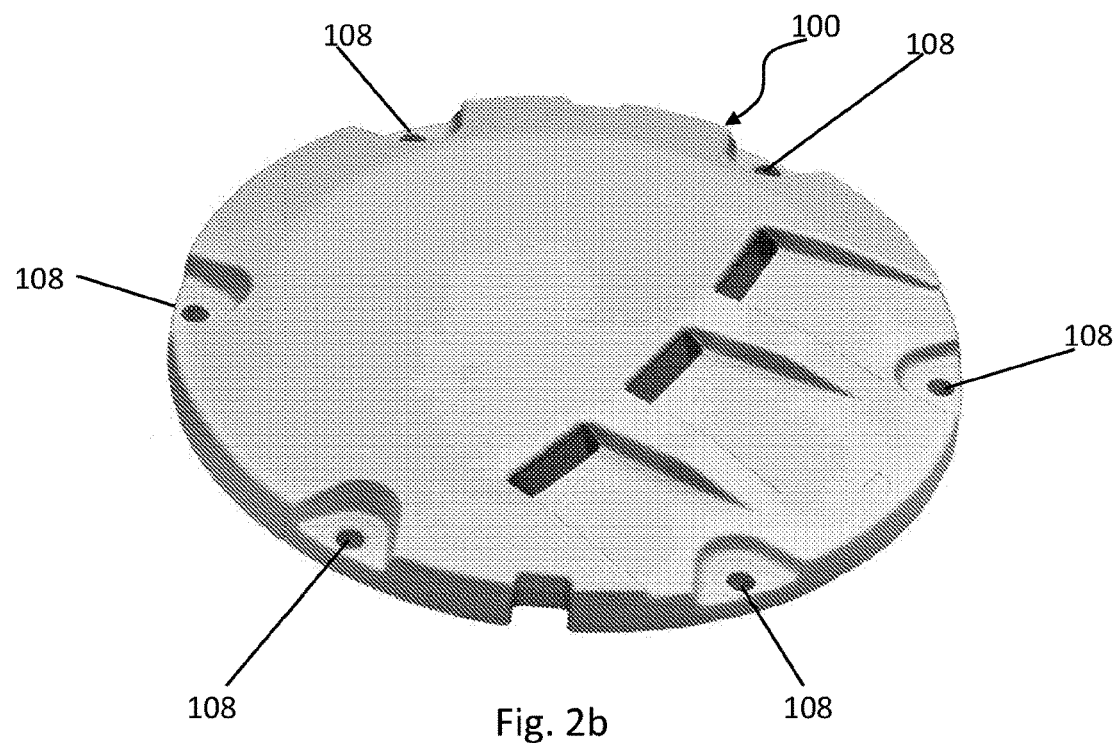
FIG. 2b shows an exemplary computer rendered representation of another type of light used in airfield ground lighting systems without defects.

The light 100 depicted in FIG. 2a has a plurality of bolts 110 in holes 108 which retain the lights in a position in the runway or concourse (the holes are not shown in FIG. 2a but are visible in FIG. 2b). The bolts are located in a metal ring 112 which is surrounded by an epoxy ring 114, which allows for some movement in-situ during thermal expansion/contraction of the light relative to the surrounding asphalt (e.g. during environmental temperature variation). The actual light is emitted from an inset light 116 at the centre of the metal and epoxy ring arrangement.

Figure 2C:
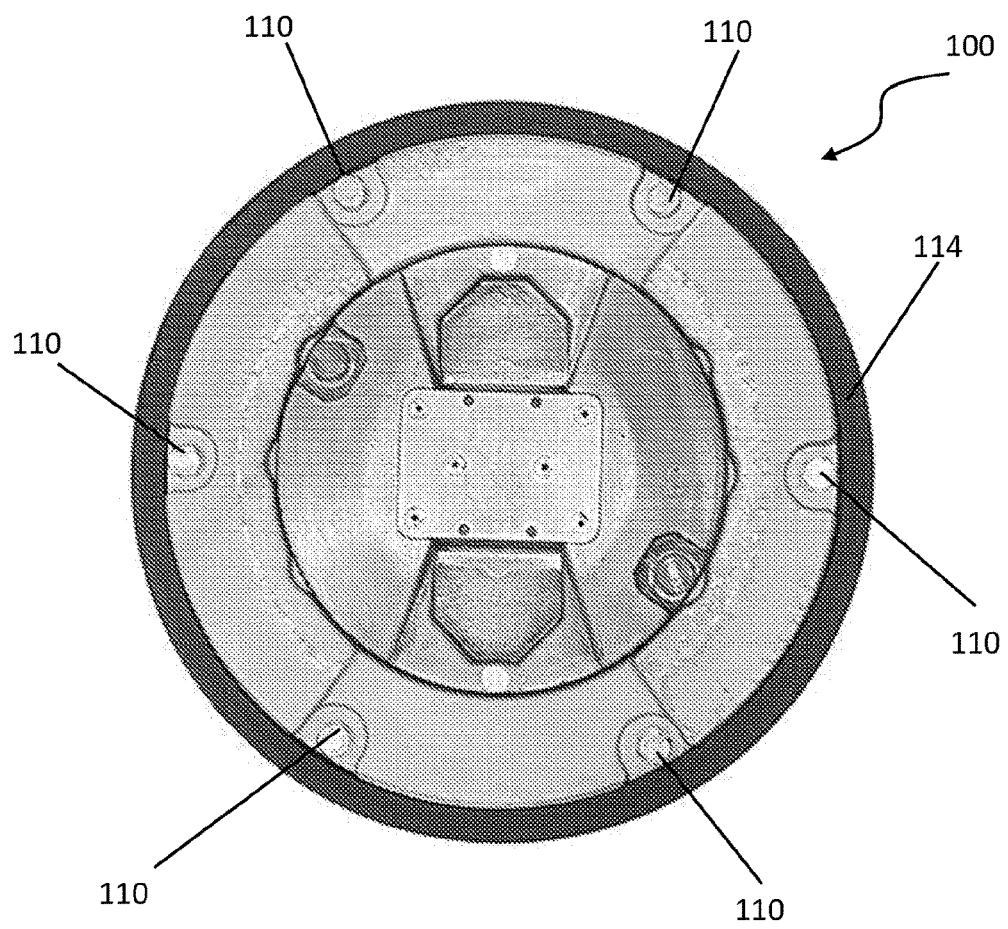
FIG. 2c shows an exemplary photograph of another type of light used in airfield ground lighting systems without defects (clean)
Figure 2D:
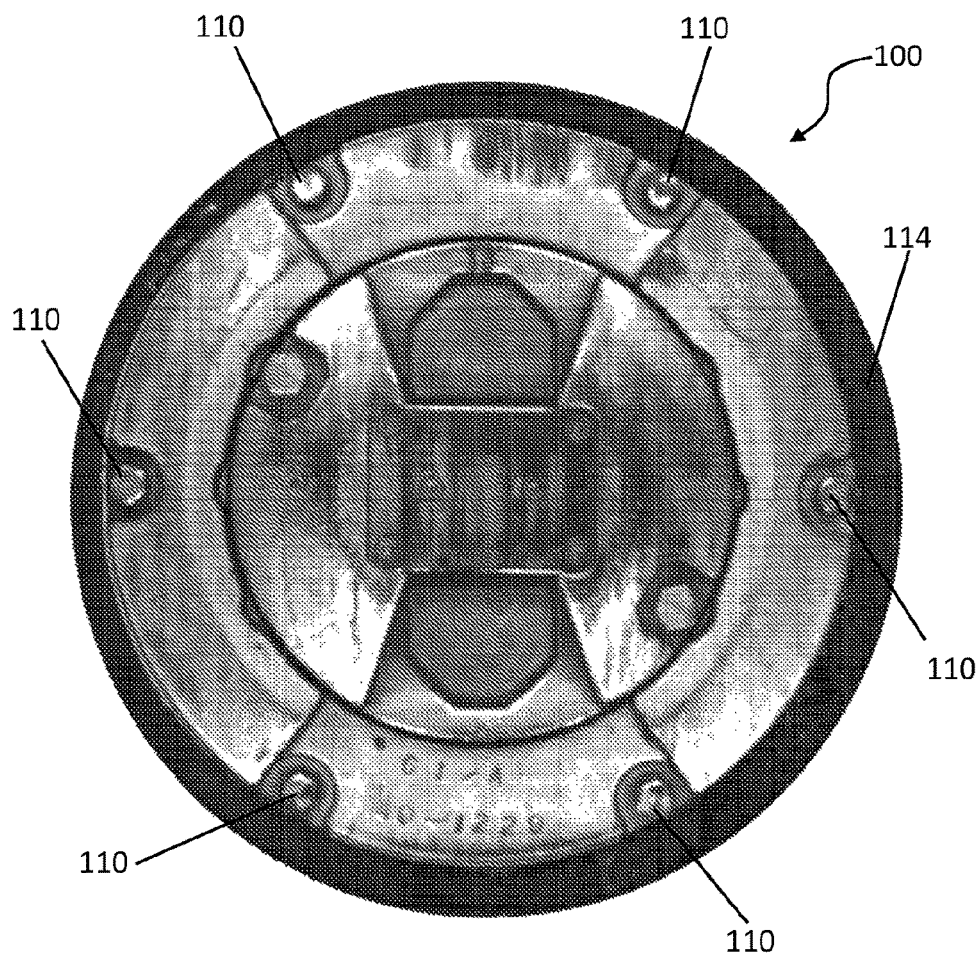
FIG. 2d shows an exemplary photograph of the light of FIG. 2c without defects (after use)

Many of these items can also be seen in the computer rendered representation of the light depicted in FIG. 2b and in the photograph of an actual light of FIG. 2c (clean) and the light (after use) shown in FIG. 2d. (The embodiment of FIG. 2b does not include an inset light which is separable from the metal ring 112, and the epoxy ring 114 has been removed for clarity).

It would also be appreciated that the lights depicted in FIGS. 2a-2e have variable geometries, arrangements of bolts/nuts and inset lights, and are exemplary only. Alternative or additional items to be checked may also be present in the lights which may be monitored as taught in the present disclosure without departing from the scope of the present invention.

Figure 2E:
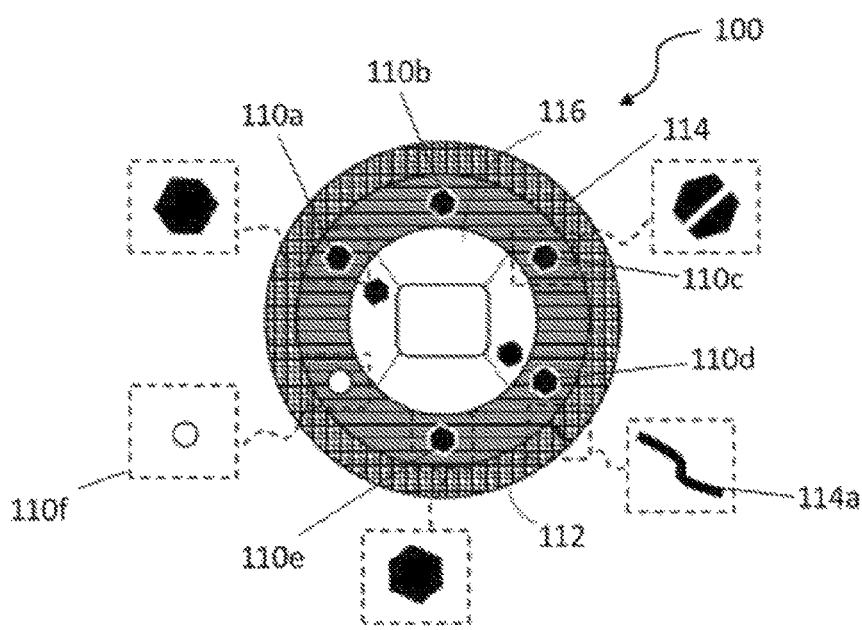
FIG. 2e shows a schematic view of the light of FIG. 2a having a number of defects.

Referring now to FIG. 2e, there is depicted an exemplary schematic view of the light of FIG. 2a having a number of integrity issues. These issues are highlighted by the various exploded boxes for emphasis as is detailed below and exemplary representations of the types of issues which may be detected by the present disclosure.

Typically, lights in an airfield ground lighting system receive a significant loading force when contacted by the landing gear of aircraft as they touch down. Rubber residue from melted tyres, loosened and missing bolts/nuts, cracked epoxy, misalignment of bolts and other integrity issues can be caused by this repeated cyclical wear.

Condition of the lights needs to be monitored so that action can be undertaken to prevent and/or remedy failure.

Turning to FIG. 2e, there is a mixture of conditions representative of a typical state of a light in the airfield ground lighting system. For example, as depicted the head of the bolt located in the 10 o'clock position 110a is in an appropriate position. The second bolt 110b at 12 o'clock position is present and aligned appropriately. However, the third bolt 110c is loosened relative to the position in which it should be, represented by the misalignment of a centreline of the bolt with a corresponding feature. (It would be appreciated that a variety of bolts/nuts could be used, with or without marked centrelines and having variables numbers of sides, dimensions etc. without departing from the present disclosure).

Bolt 110d at 4 o'clock is present, and in a correct position and alignment.

Bolt 110e located at the 6 o'clock position has been loosened relative to its appropriate position, and bolt 110f at the 7 o'clock position is missing.

A crack is located in the epoxy ring located at the 5 o'clock position and shown in expanded view 114a.

Appropriate maintenance action needs to be taken before the performance of the light depicted in FIG. 2e is compromised.

It would be appreciated that the specific integrity issues of FIG. 2e are exemplary only, as is the layout and configuration depicted. A variety of other integrity issues which are visually apparent may also be detected and the present disclosure is not limited to the integrity issues detailed in FIG. 2e. Additionally, a variety of fasteners, and nut and bolt arrangements may be utilized without departing from the scope of the present disclosure.

Figure 3A:
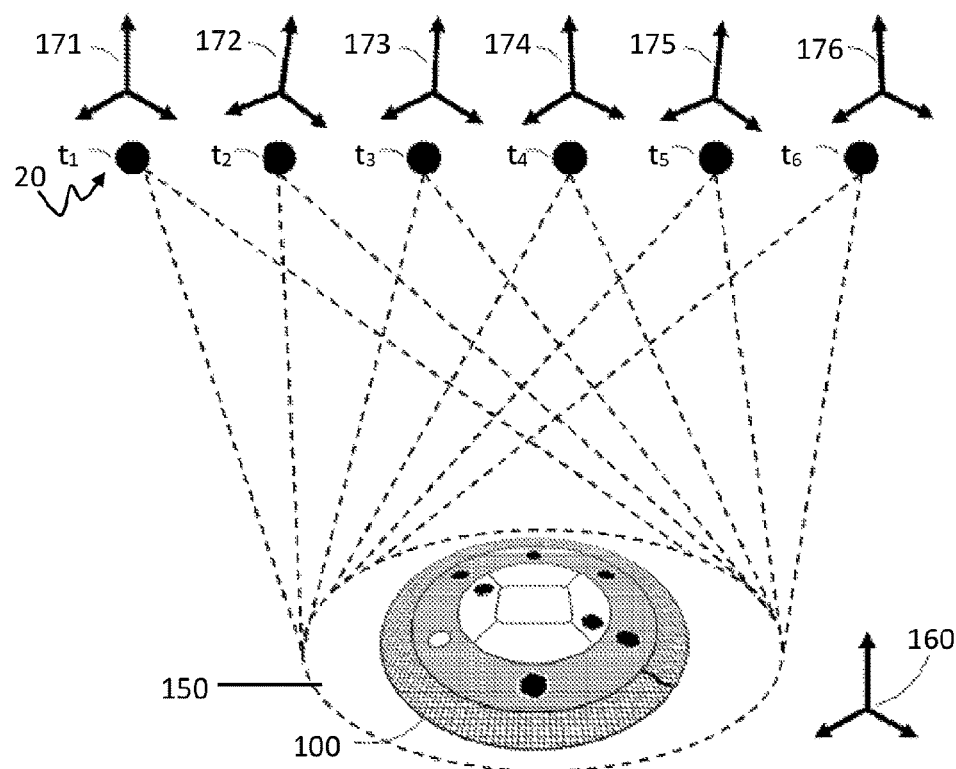
FIG. 3a shows a schematic perspective view of the light and optical centres of the image acquisition means of the moveable platform as it traverses across an exemplary light.
Figure 3B:
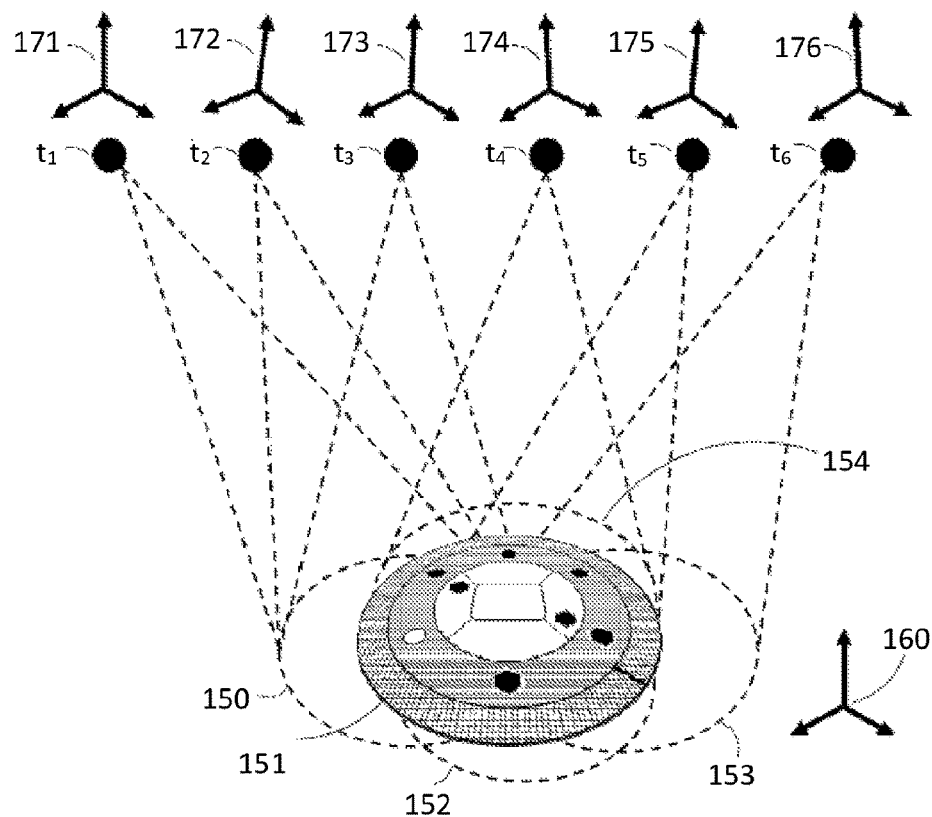
FIG. 3b shows a schematic perspective view of the light and optical centres of the image acquisition means of the moveable platform as it traverses across a light where the images in the image stream have different and overlapping fields of view.

Referring now to FIGS. 3a and 3b, there is depicted a schematic perspective view of the light 100, showing the image acquisition means 20 at various instances in the time interval t1 to t6; together with various coordinate frames of the light and of the image acquisition means.

For simplicity, the origin of the camera/image acquisition means 20 is represented as a dot 20 which traverses in the direction of from the left to the right of the page as the mobile platform 10 moves across the light 100. This movement of the image acquisition means 20 is represented by the dots labelled t1 to t6.

The field of view 150 of the image acquisition means 20 as it traverses the light 100 at various points t1 to t6 is common in FIG. 3a shown.

For ease of reference, the coordinate frame (fixed) of the light 100 is represented by coordinate frame 160. Relative to this coordinate frame, the various points in the "real world" which make up the items to be checked in the actual light of the light are fixed relative to this coordinate frame.

The frame of reference for the high speed image acquisition means 20 at the various time intervals is depicted by the successive coordinate frames shown in the figure and marked with numerals 171, 172, 173, 174, 175 and 176.

Referring to FIG. 3b, the same coordinate frame for the high speed image acquisition means at various points t1, t2, t3, t4, t5 and t6 can be seen—171, 172, 173, 174, 175 and 176. The fixed coordinate frame of reference for the light is depicted by coordinate frame 160.

In the representation of FIG. 3b, the various fields of view 150, 151, 152, 153 and 154 of the image acquisition means correspond to the fields of view for the image acquisition means at various time interval. Thus, in FIG. 3b, the combination of the various fields of view of the high speed image acquisition means of the various time intervals together provide a composition field of views, in contrast to the single common field of view shown in FIG. 3a.

Figure 4:
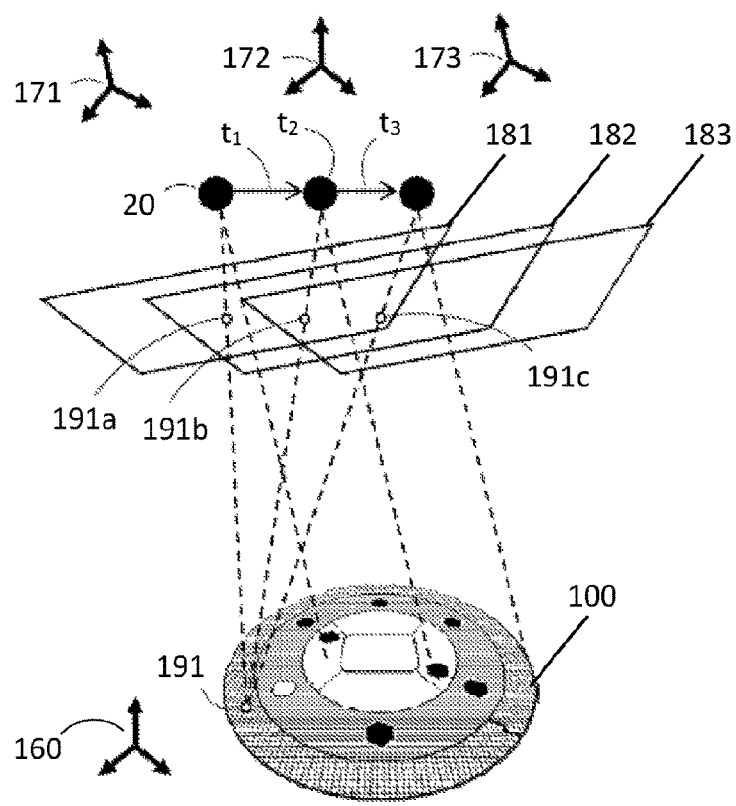
FIG. 4 shows a schematic perspective view of the light and representative images captured from the image acquisition means of the moveable platform.

FIG. 4 depicts a schematic representative view of the light 100 and representative image planes showing a small circle representing one of the points that make up the actual item of the light to be monitored (e.g. a particular portion of the light such as a bolt or metal ring). Thus the "scene point" of the light is depicted in an image captured by the image acquisition means at three different positions at t1, t2 and t3 respectively.

Specifically, the 2-dimensional images captured are represented by image planes 181, 182, 183. Each image plane contains a point representative of corresponding scene point 191 of the light 100 represented by small circles (191a, 191b, 191c) on the image planes shown.

It would be appreciated that the scene point 191 of the light 100 is depicted in the image plane 181 as point 191a. This point is the point of intersection in the image plane of a normal to the image plane, drawn to extend from the image acquisition means 20 at time interval t1, and to the scene point 191 in actual three dimensional space for the light 100.

Similarly, scene point 191 of the light is depicted in image plane 182 as 191b. This point is the point of intersection in the image plane of a normal to the image plane, drawn to extend from the image acquisition means 20 at time interval t2, and to the scene point 191 in actual three dimensional space for the light 100.

Accordingly, as the high speed image acquisition means traverses across the light, the subsequent images captured are represented by image planes 181, 182, 183. Points 191a, 191b, 191c represent images of scene point 191 of the light 100 which are located in various positions in the image captured—ranging from the far left side through the middle and towards the far right side of the image depending on the position of the high speed imaging means relative to the scene point as it traverses the light.

These series of images forming an image stream of a light could be analysed one-by-one to determine the presence or absence of points in the images, (and thereafter to determine the presence or absence of the group of points which make up particular items in the image to be checked). As is known in the art, detection of points in an image utilises known extraction algorithms, or may be conducted by manual processing.

However, variations in the optical characteristics of the light (including marking with rubber residue, loosened or damaged parts etc.) as well as variables in the position of the image acquisition means (including bumpiness of the moveable vehicle altering field of view of image acquisition device etc.), can mean that the series of images in the image stream may include points which are extracted and identified incorrectly. Hence, no single image of the image stream can be relied upon to definitively determine the location of that point in the actual light coordinate frame.

When taken together, incorrect extraction of points in the images means that false detections of the items to be checked may occur. Thus, capturing a series of images and attempting to interpret these using the above approach provides inconsistent and inaccurate results-without reliability for example on the alignment, presence or absence of a crack in the epoxying, and presence or absence of the bolts/nuts to be checked.

Figure 5A:
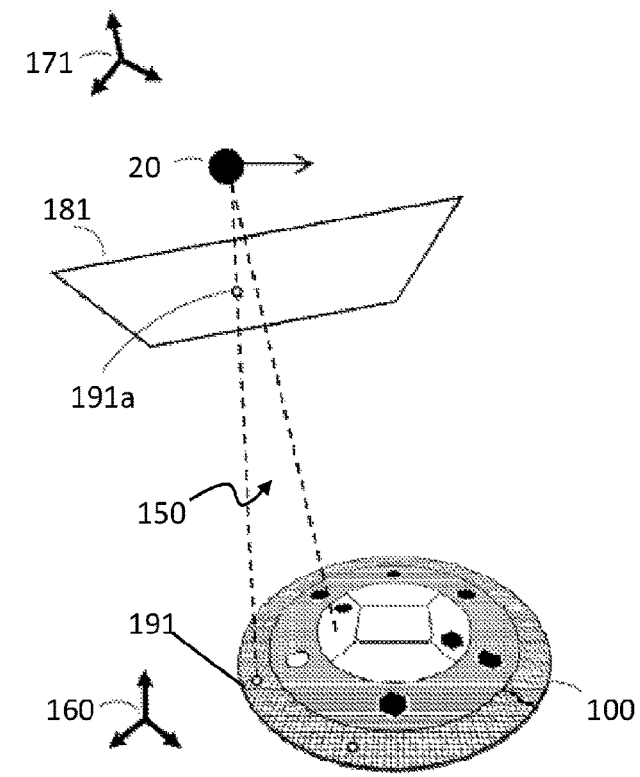
FIG. 5a shows a schematic perspective view of the light and a representative image captured by the image acquisition means of the moveable platform in an initial position at t=t1.
Figure 5B:
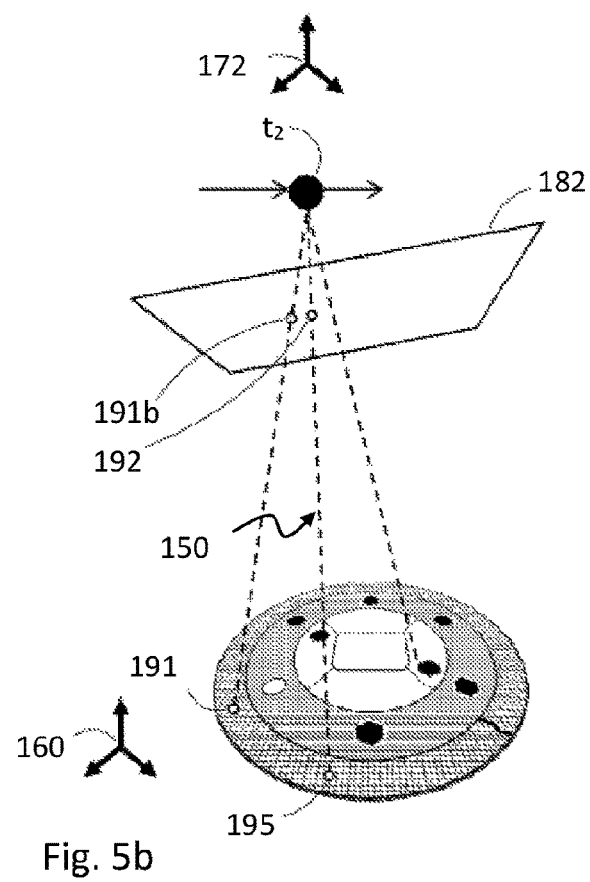
FIG. 5b shows a schematic perspective view of the light and representative image thereof captured by the image acquisition means of the moveable platform in an subsequent position at time t=t2.
Figure 5C:
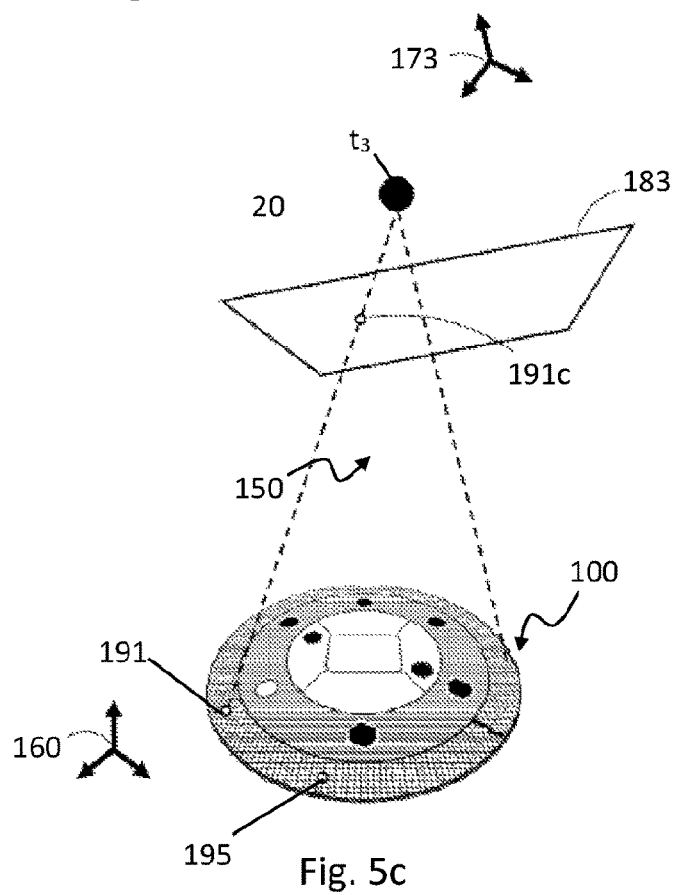
FIG. 5c shows a schematic perspective view of the light and representative image thereof captured by the image acquisition means of the moveable platform in a final position at time t=t3.

Referring to the schematic representation of the system depicted by FIGS. 5a-5c, there is shown a way for rectifying inaccuracies in detection by increasing the sensitivity and reliability of the extraction technique by considering a series of images of the same subject (a light used in an airfield ground lighting system) when captured from a moving image acquisition means.

Identification of points making up the items to be checked from a first image followed by determination of the location of such points in the frame of reference for each image thereafter (i.e. allowing for the relative displacement of the image acquisition means) enables projection of a theoretical location of the scene points into one or more subsequent images of the light. It is noted that in itself this does not increase the accuracy of the feature detection in the series of images.

However, the presence of points making up an item to be checked in images in an image stream can be verified by processing a first image to detect the location of the point(s), then processing a subsequent image by allowing for the change in the position of the image acquisition means between the two images. Verification may be provided by comparing a projection of where the point(s) should be in the subsequent image undertaken against extracted points, to determine whether the projection from the corresponding "scene" point(s) are actually in the subsequent image at their predicted location.

By specifying a threshold score value above which point(s) comprising an item are considered as being present within an image, and as between subsequent images, means a number of images can be analysed to provide certainty as to the presence/absence of particular point(s) making up the item to be checked. This in turn enables the determination of the whether integrity issues in the actual real world subject of that image, in this case, in a light of an airfield ground lighting system exist.

FIGS. 5a-5c and FIG. 6 represent the detection of a specific scene point 191 in the light 100, but it would be appreciated that other scene point(s) comprising items to be checked could be detected. It would be appreciated that the light depicted in the image being checked could have any one or more of the integrity issues shown in FIGS. 2a-d without departing from the scope of the present disclosure.

Turning to FIGS. 5a-5c, there is shown a light 100 including a variety of defects and with the same components as the system identified in FIG. 4. The image acquisition means (represented by the dot 20) traverses the light 100, capturing a series of images which are represented by image planes 181, 182, 183.

Similar to the system depicted in FIG. 4, in the system of FIGS. 5a-c, a feature corresponding to the metal ring on the light 100, scene point 191, is represented on the image plane as feature point 191a.

The coordinate frame for the light 100 is depicted as 160, and is fixed for each of FIG. 5a, 5b, 5c in three dimensional space for the images in the image stream.

The coordinate frame for the image acquisition means at t1 is 171 in FIG. 5a, which schematically depicts the first image acquisition in the image stream and the position of the respective components at the point of acquisition.

As the image acquisition means traverses across the light, the field of view and positions of various components changes to the arrangement depicted by FIG. 5b.

In FIG. 5b, image plane 182 represents the image acquired of the light 100, from the position of the image acquisition means 20 at t2, having a coordinate frame 172. The frame of reference for the light 100 remains constant with coordinate frame 160.

As depicted, a point which is part of the metal ring 191 of the light 100 is detected as feature point 191b on plane 182.

However, another point 192 is also detected, which is actually another feature of the metal ring of the light 100 as depicted by scene point 195.

This error is apparent, when the point 191c on the next image plane 183 acquired from the image acquisition means 20 with a frame of reference 173 and the frame of reference for the light 160 is detected, as shown in FIG. 5c. This point 191c represents the scene point 190 of the metal ring of the light 100 at t3.

Accordingly, based upon movement from FIG. 5a to FIG. 5b of the image acquisition means and the movement from FIG. 5b to FIG. 5c of the same image acquisition means, incorrect detection of the scene point 192 on the light 100 in processing FIG. 5b can be ignored, based upon reliable detection of the points depicted by 191a,b,c on image planes 181, 182, 183 shown in FIGS. 5a-5c respectively.

More detail on the interpretation and extraction of the points of the items being checked from the images, as well as the determination that an item 192 has been incorrectly detected is provided below.

Figure 6:
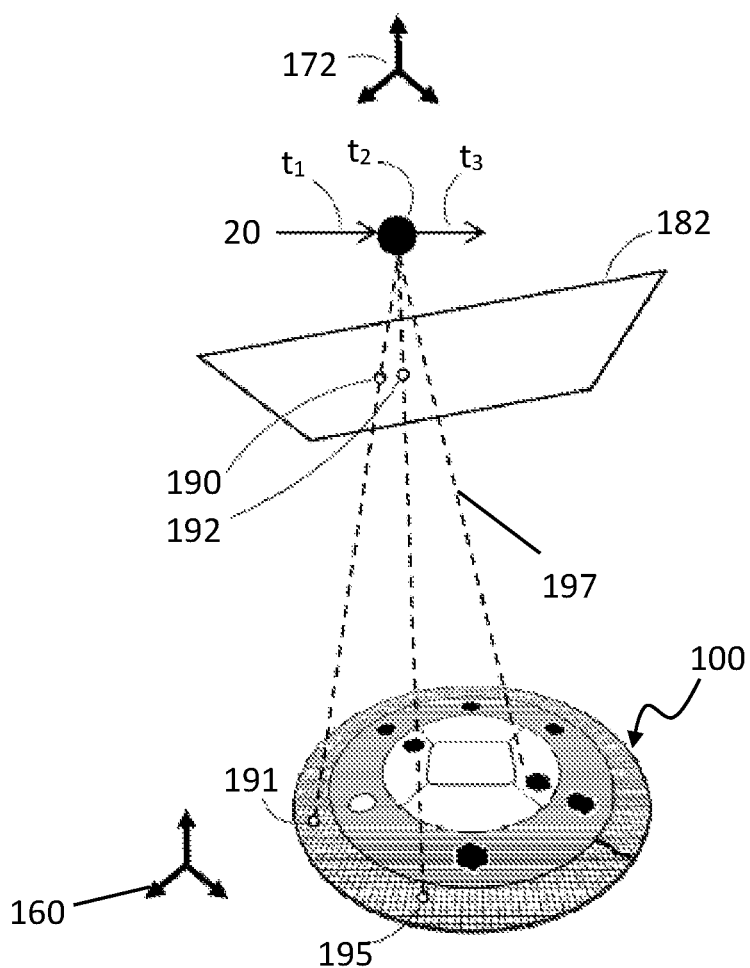
FIG. 6 shows a schematic perspective view of the light and representative image thereof, including an incorrectly detected feature.

Referring now to FIG. 6, there is shown a schematic depiction of the light 100. The light 100 has scene points 191 and 195 of a coordinate frame of reference 160.

The image acquisition means 20 depicted by a dot, travels across the light 100 with the positions at time t1, time t2 and time t3 indicated by arrows. In FIG. 6, the actual dot is shown at position t2, with a corresponding frame of reference 172 for the image acquisition means.

Similarly as with the figures depicted in FIG. 5a to FIG. 5c, relative to the image plane 182 shown, a normal line 197 extends from the image acquisition means orthogonal to that image plane. As shown, it will be appreciated that the point 191b is detected in the image at t2 on the image plane 182, corresponding to the scene point 191 in the actual light. However, FIG. 6 also shows the detection of an error point indicated by 192, which represents incorrectly identified point, in this instance corresponding to scene point 195.

As discussed with reference to FIG. 5a and FIG. 5c, by reviewing the images captured from the acquisition means at t1 and t3, the incorrectly detected scene point 195 in the light 100 can be ignored. Rejection of this incorrect detection of a scene point in turn facilitates more accurate detection of the points which make up the items to be checked, and in turn the overall status of the item(s) for that light to be checked.

Figure 7:
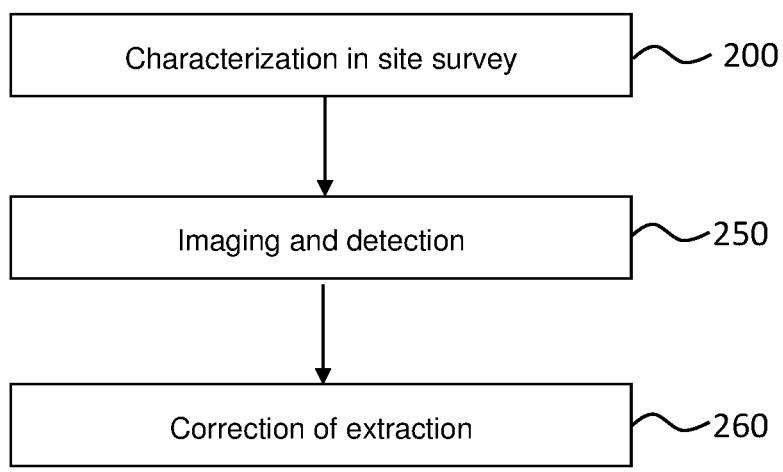
FIG. 7 depicts an exemplary flow chart according to an embodiment of the present disclosure outlining the various stages in deployment of the system.

An overview of this process, from a conceptual perspective is detailed in FIG. 7.

As set out, following a survey of the light in the airfield ground lighting to be checked 200, the points which comprise various items in the image to be checked are specified (for example, the points making up the conditions of missing bolt/nut, loosened bolt/nut, missing light, missing ring and crack in an epoxy etc.)

These items are made up of a series of points which need to be detected. It is necessary to calibrate the system in this way so that it can differentiate between fault states and acceptable states for various status of particular lights to be inspected. This calibration is conducted by the feature characterising training process, which is discussed in more detail below with reference to FIG. 8.

Once the respective characterisation of status for the lights of a particular airfield lighting system has been performed, the imaging process 250 can be conducted.

Typically, the imaging process 250 requires propelling (either attached to a vehicle or manually pushing) the moveable platform of the present disclosure across the lights in order to acquire images.

Airfields may be divided into separate zones with different checking required of the lights in the respective zones depending on the level of usage and surface conditions. Lights in respective zones may be associated with a unique identifier, which enables logging the state of the items of a specific light to be checked based upon a specific image stream. This means that an operational baseline for each light can be established—determining when maintenance is required, and once performed, whether the maintenance team has actually addressed a particular integrity issue.

For example, a fastener such as a bolt may be detected as loosened after capturing a first image stream, when the platform is moved across the airfield. This integrity issues may be passed on to maintenance team for rectification. When the platform is moved across the airfield again, the aforementioned bolt of that light may be verified as being tightened in the next captured image stream of this light. If maintenance has not been performed on that light, or has been performed incorrectly this will also be identified by the system and escalated.

Once the images have been acquired and characterised, corrections and analysis techniques 260 can be employed to ensure that the appropriate points are detected, reducing false positive and false negative detection errors. Error sources include variation in the position of the image acquisition means (e.g. due to bumping), tyre residue on the light confusing feature detection, variability in illumination conditions, angles, calibration errors, variance in surface condition, artefacts from painting, wet surfaces etc.

Figure 8:
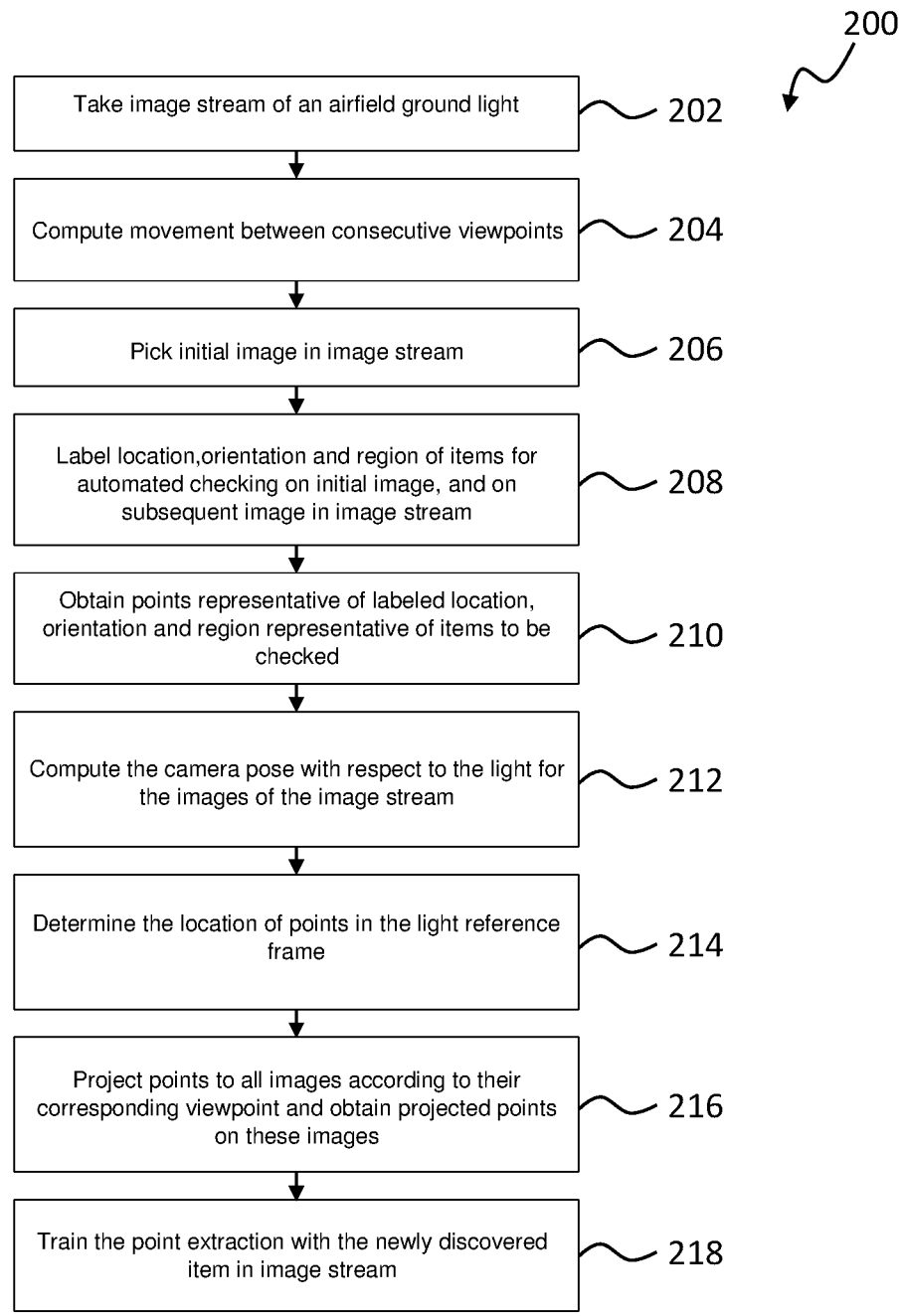
FIG. 8 depicts an exemplary training flow chart of the training phase of an embodiment of the present disclosure.

Referring now to FIG. 8, there is an exemplary flow chart which sets out in more detail the characterisation process 200 conducted to calibrate the inspection system for lights. This flow chart depicts a training method by which the points that characterise the item to be checked and hence the operational status of a light can be recognised by the system. This enables the system to identify points in an image, and then discriminate between correctly detected points and incorrectly detected points in an image stream of a particular light for certainty of detection (errors may arise due to variance in the imaging process as discussed above).

At step 202, the images of a light of a particular type are acquired by propelling the platform over the light in situ. Location information is also captured for during the acquisition of the images in the image stream of the particular light.

Location information may also include information determined from Global Navigation Satellite Systems such as GPS, GLONASS, Beidou, Galileo or similar such systems without departing from the present disclosure, either together with or in addition to location information on the various lights in the specific airfield.

Movement may be accurately determined by inertial measurement, using a dead reckoning method such as MEMS type tri-axial inertial sensor (such as an accelerometer (with or without rate gyro)). The dead reckoning method utilized can be achieved by modelling updated measurement and sensor error in an optimal state estimator such as a Kalman filter. (For example inertial measurement such as linear acceleration may be used to deduce the distance traveled, and measurement error can be modelled by first principles, and verified by subsequent data sampling).

This process has been schematically depicted in FIGS. 5a to 5c and FIG. 6.

Using the captured positional or location information in step 204, the movement of the image acquisition means when capturing the images in the image stream can be determined.

As step 206, the operator selects an initial image from the image stream of the light being characterised. (It should be noted that this "initial image" does not necessarily need to be the very first image in the image stream, it is merely an image which precedes the subsequently selected image in the image stream).

The location, orientation and region of the items to be checked for subsequent automated detection can be manually labelled by the operator on this image, using a mouse or cursor to highlight the appropriate region comprising an item of interest—as a "bag/group" of points in step 208.

A subsequent image of the plurality of images following in the image stream of the light 100 then may also be selected and then manually reviewed. The outcome of this manual review is specification of the "bag/group of points" which makes up each item to be checked for a specific type of light for that pair of images.

In step 210, within the specified "bag of points" in a region, there are certain characteristics (e.g. a predetermined spatial relationship, frequency of occurrence, shading etc.) which amount to a characteristic signature for the feature to be checked in that specific light. Various parameters such as the histogram of oriented gradients and normalised gradients can also be determined for the specified "bag of points" in the item to further assist.

At step 212, for the initial image (and subsequent image) the camera orientation may be determined using location information, which is based upon the movement information determined for the consecutive positions of the image acquisition means in step 204 and the location of the point pairs in a particular orientation in the subsequent consecutive images.

A direct linear transform could be employed to carry out the prediction of the position of the camera during the acquisition of the other images in the image stream where there are less than four or more point pairs. (It would be appreciated that once there are more pairs, optimisation techniques can be utilised, such as the least square method etc.).

Once the position and orientation of the image acquisition means has been determined for the first and subsequent image, the corresponding location of the points comprising the item to be checked in the actual light depicted in these images can be identified in step 214. This can be done by using epipolar geometry using the known location of the image acquisition means for the initial image and subsequent image of the image stream.

Based upon the determined location of each of the scene points which make up an item in the light ("in the real world") to be checked, using the locations thus determined as reference locations for the respective scene points and taking the known position of the image acquisition means, the location of each of the points can then be projected to all of the images in the image stream as shown in step 216.

Therefore, based upon the estimated camera location, location information and manually specified characterisation information, in the first and subsequent following image in the image stream, the anticipated locations of the points in subsequent images in an image stream of a light can be predicted.

This process can then be repeated for all points making up an item to be checked in the subject light, and then for all items in the subject light, to characterise various states and conditions of the points therein.

In particular, a supervised learning approach such as a discriminative classifier can be used to process the images to confirm the point extraction process for the image in the image stream of the specific light as is represented by step 218.

As is known in the art, such a discriminative classifier may involve using a labelled sample which allow for points to be described in higher dimensional space, and projected to other dimensional spaces thus enabling comparison of points with respect to each other or against a baseline, by drawing a simple line. In this way, the points are linearly separable.

Advantageously, although there is an initial step of labelling the points comprising an item to be checked in the first and subsequent images of the light, there is no need to continue tediously labelling all points for all items to be checked in all subsequent images in an image stream in order to enable accurate detection.

According to the training method of the present invention, the projection of the anticipated location of points comprising an item in subsequent images (after they have been manually specified in the first and subsequent image) reduces significantly the amount of tedious manual labelling required.

Figure 9:
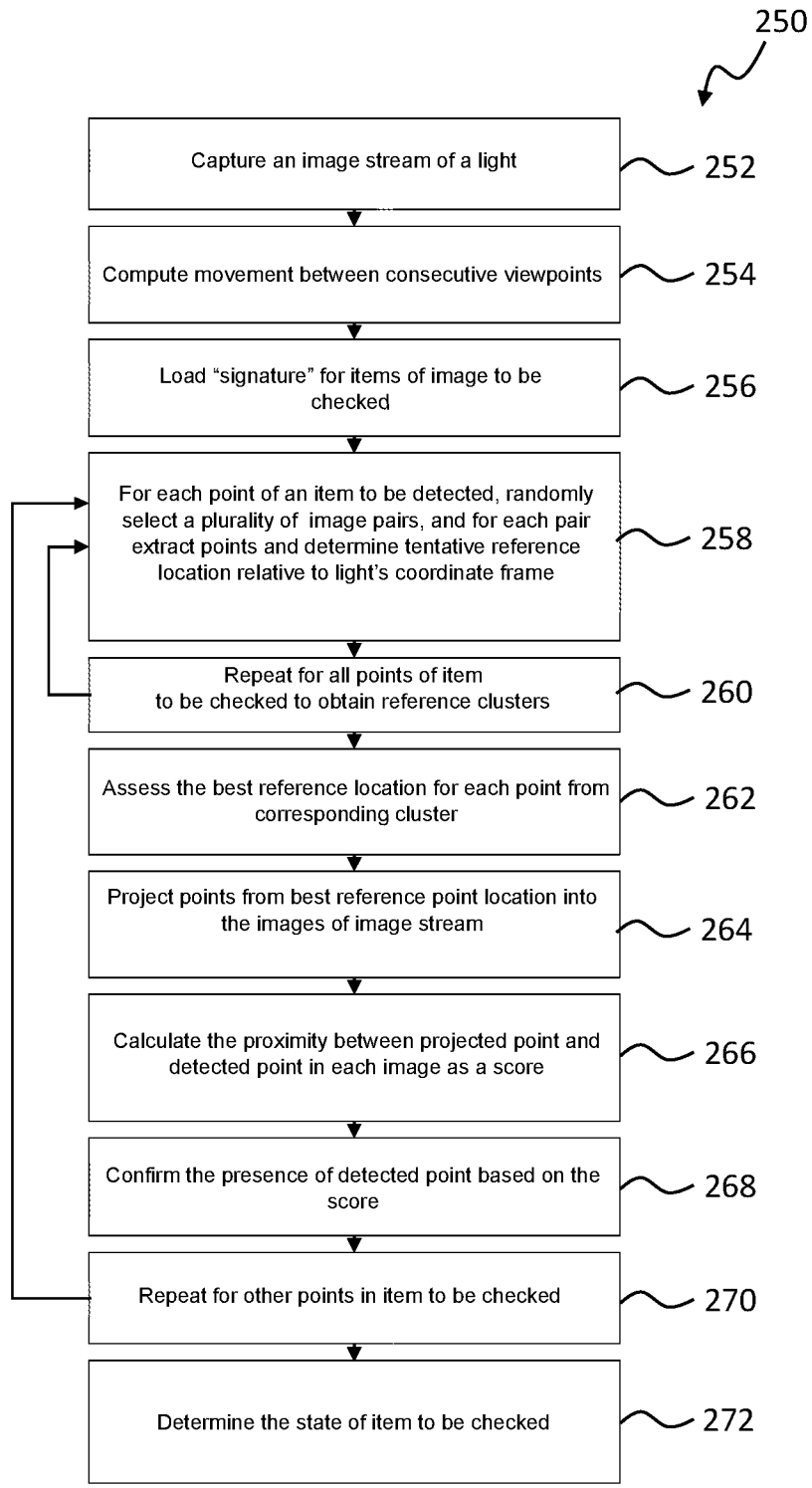
FIG. 9 depicts an exemplary flow chart outlining the various steps in an image detection method according to an embodiment of the present disclosure.

Referring now to FIG. 9, there is depicted an exemplary flow chart in which the steps of imaging and detection 250 and correction and analysis 260 of FIG. 7 are actually performed.

At step 252, an image stream of a light is captured by moving the housing across the light 100. Location information is also captured as has previously been detailed at step 204. It would be appreciated that this image stream would be one of many image streams of many lights acquired as the housing is moved across the airfield. However, for the purposes of simplification, the process is described with respect to one such image stream of one light.

Captured location information is then used to determine the location of the image acquisition means between consecutive capture points in step 254.

In step 256, the "signature" of points comprising each item in the light to be checked is loaded. (As previously described in relation to step 210, items of the light to be checked have unique characteristics which have been identified following the training 200 depicted in FIG. 8, and it is this record which is loaded.)

At step 258, for each desired point in the image of the item to be checked for integrity, a pair of images is processed to determine a probable location in the light coordinate frame of that feature.

From the pair of images processed, a corresponding location of the point in the actual real world light coordinate frame is determined as taught by step 214.

This process is then repeated in step 260 for all the desired points to be checked, in all items to be checked, for multiple randomly selected pairs, in order to determine multiple locations of the various "real world" points with respect to the light coordinate frame for each of the points which make up the various items to be checked.

At step 262, the best scene point or reference location for each of the points in the item to be checked is determined. This may entail using k means clustering or similar such processes.

Once the best reference location for a point has been determined it is stored. The determined position for the image acquisition means of that image in the image stream, the stored reference location, and the movement of the image acquisition means are all used to project from the appropriate reference location for that point and the viewpoint of the image acquisition means into where corresponding locations for that point would appear in subsequent images in the image stream in step 264.

Thus, the images in the image stream can then be processed in 266, by image processing to detect proximity.

The integrity of the point extraction can then be determined by calculating how close the projected points and detected points are in the images, allowing for the change in position of the relevant viewpoint of the image acquisition means. This may entail using both intrinsic and extrinsic camera parameters.

Thus, in step 266 the projected location of a scene point and the detected location of that scene point in each image in the image stream are compared. (This process is undertaken for all points which make up a single item to be checked in the images of the image stream). The comparison made at step 266 is between the estimated or anticipated position of a point (based upon location information and the determined image acquisition location) and the location of the point detected from an image (according to the specified characteristics used for image detection of that point). The proximity can be reflected as a score, which is representative of a pixel distance by theoretical and detected features for that image.

For example, a score that is inversely proportional to the sum of this distance across the images can be used as a score determining the presence of an item in an image. Therefore, when distances between the detected location and the projected location are large, this point in that image has a low score.

A determination can then be made as to whether the detected point is present at step 268.

Optionally, the above processing steps then can be repeated for all of the points which make up the item in the light to be checked at step 270. Similarly, this process may be repeated for the points which make up other items which are being checked.

Once the points making up an item being detected have been scored for a series of images (based upon correlation with the corresponding projected location of the points in those images) the state of the item being checked can be determined by conducting further analysis at step 272.

For example, the orientation position and presence of the item may be evaluated. For example, the presence of a combination of corners, surface line contours and various "chromatic image patches" for the typical of a head of a bolt/nut as well as the absence of circular contours and chromatic patterns can be used to determine the presence of a bolt/nut at particular locations of the light.

The presence and location of corners and the orientation of the corners and lines of a bolt/nut can also be used to determine the orientation of the bolt. This means that based upon the characterisation survey at step 200 in FIG. 7 and the detected image acquisition means orientation when capturing the actual image stream that has been determined in process 250, the relative position of the bolt head/nut may be determined. That is, whether a bolt is loosened or missing may be identified using the corrected detection of those points comprising the item as discussed above.

Similarly, the presence of the inset light may be detected by the presence and absence of certain combinations of chromatic image patches contours and corners. Furthermore, the detection of an epoxy ring 114 can be made by the detection of patches and circular lines. Finally, in order to detect whether or not an epoxy crack exists in a light, the presence of certain characteristic lines or contours corners in combination with chromatic image patches in the region of the epoxy ring can be used in the determination of whether a crack is present.

Figure 10:
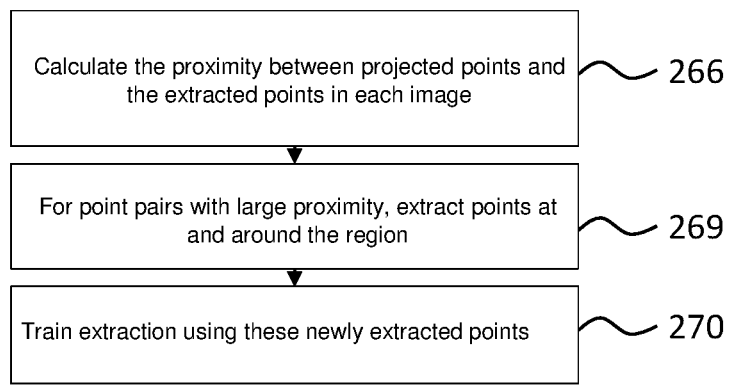
FIG. 10 depicts an exemplary "learning" algorithm by which the feature extraction sensitivity may be improved.

Referring now to FIG. 10, there is discussed in more detail the various steps in the calculation which may be performed at step 266 and subsequent steps.

At step 266, the proximity between the projected point making up the item to be checked and the feature in image as detected is determined.

Turning to step 268, where a large separation exists between the projected point and the detected point of each image, this means that the detected point can be considered as not being representative of the actual point of the item. However, this can also be a useful training aid for other features including histogram of oriented gradients and normalized gradients which could be used to detect this point.

In this way, where there is a large difference between the location comparing the projected feature point (derived by projecting from the scene point to various images in the image stream) and extracted point (extracted based upon image processing technique e.g. histogram of gradient), this feedback may be incorporated in the characterisation process discussed in FIG. 8. Various points around the extracted point with the large discrepancy/difference can be used for example as a labelled sample for training to recognise this point in future extractions.

Accordingly, the process and system of the present disclosure is able to reinforce the accuracy of the detection and processing to cater for additional items to be checked which may not have been specified in the initial characterisation process.

The present disclosure provides a method and system which avoids the tedious manual process of airfield ground lighting system inspection.

By employing a location sensor, image extraction for points making up the various items of the light to be checked, training on an image, and re-projection of the detected items based upon the determined location of the image acquisition means and reference points making up the actual item, the present disclosure ensures a highly accurate and potentially continuously improving system. Once lights of a particular model have been characterised, the system is configured such that variants in acquisition of the image and lighting conditions do not have a significant impact on the detection accuracy.

Being able to automatically rapidly evaluate the condition of a light enables detailed light cycle monitoring for each light in the airfield. The inclusion of a unique identifier for each light (and the logging of the position information or region) for that light enables a detailed maintenance programme to be provided, with areas of high traffic receiving more attention than corresponding areas.

Accordingly, the present disclosure provides a time saving, accurate, and cost effective way of managing the ongoing inspection of lights. The inspection system of the present disclosure reduces runway closure times, enables inspection in even bad weather, and enables complete life-cycle management of an airfield's significant fixed infrastructure investment in airfield ground lighting. The prompt maintenance and rectification of issues enabled by the inspection system of the present disclosure also reduces the potential for foreign object debris on the runway areas from the airfield ground lighting system.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

The invention claimed is:

1. A method of assessing the condition of one or more lights in an airfield ground lighting system, the method comprising:
   capturing by an image acquisition means an image stream of the light of the airfield ground lighting system by moving a housing having the image acquisition means disposed therein across said light;
   detecting the location information of the image acquisition means whilst capturing the plurality of images comprised in the image stream by a location sensor coupled image acquisition means;
   processing the image stream of a light of the airfield ground lighting system by a processor coupled to the image acquisition means by:
   (a) associating characteristics of a plurality of points in an image with an item to be checked in the image of the light to be checked, and
   (b) extracting the points from the images of the image stream wherein said extraction is by;
      (i) analysing a plurality of randomly selected pairs of images from the images of the image stream to determine a plurality of tentative reference locations, one for each of the pairs of images for each extracted point relative to a three dimensional coordinate frame of the light;
      (ii) assessing the tentative reference locations determined for each extracted point, to determine a reference location for each extracted point;
   (c) projecting each extracted point into the images of the image stream based upon the determined reference location of said each extracted point and location information of the image acquisition means for each image;
   (d) analysing the images of the image stream by comparing the locations in the images of the extracted points and the corresponding projected points and calculating the proximity therebetween;
   (e) verifying existence in an image of a points of the item to be checked in the image stream of the light being checked by comparing the calculated proximity against a threshold value;
   (f) repeating steps (b) to (e) to verify existence of each point in the plurality of points associated with each item to be checked in the light being checked; and
   (g) determining the state of the item to be checked based upon analysis of verified points.

2. An airfield ground lighting inspection system comprising:
   a housing having an image acquisition means attached thereto configured for capturing a plurality of image streams of a plurality of lights comprised in an airfield ground lighting system upon movement of the housing across the airfield;
   a location sensor for detecting location information for the image acquisition means capturing the plurality of images comprised in the image streams;
   an image processor coupled to the image acquisition means and the location sensor for processing the image stream of a light of the airfield ground lighting system by:
   (a) associating characteristics of a plurality of points in an image with an item to be checked in the image of the light to be checked, and
   (b) extracting the points from the images of the image stream wherein said extraction is by;
      (i) analysing a plurality of randomly selected pairs of images from the images of the image stream to determine a plurality of tentative reference locations, one for each of the pairs of images for each extracted point relative to a three dimensional coordinate frame of the light;
      (ii) assessing the tentative reference locations determined for each extracted point, to determine a reference location for each extracted point;
   (c) projecting each extracted point into the images of the image stream based upon the determined reference location of said each extracted point and location information of the image acquisition means for each image;
   (d) analysing the images of the image stream by comparing the locations in the images of the extracted points and the corresponding projected points and calculating the proximity therebetween;
   (e) verifying existence in an image of points of the item to be checked in the image stream of the light being checked by comparing the calculated proximity against a threshold value;
   (f) repeating steps (b) to (e) to verify existence of each point in the plurality of points associated with each item to be checked in the light being checked; and
   (g) determining the state of the item to be checked based upon analysis of verified points.

3. The airfield ground lighting inspection system according to claim 2 wherein the system is configured to verify any one or more of:
   the presence of a crack;
   the absence of any one or more of a bolt, a nut, a ring, and an inset light;
   the orientation of any one or more of a bolt, a nut, a ring, an inset light and a crack; or
   predetermined markings identifying the light at a predetermined location on said light.

4. The airfield ground lighting inspection system according to claim 2 wherein the images are acquired under ambient lighting conditions.

5. The airfield ground lighting inspection system according to claim 2 wherein an additional illumination means is attached to the movable housing for lighting the lights for image acquisition.

6. The airfield ground lighting inspection system according to claim 2 wherein a tentative reference location for a point in each pair of images analysed is determined using the positional information of the image acquisition means for that pair of images and the detected location of that point in the pair of images.

7. The airfield ground lighting inspection system according to claim 2 wherein the points extracted in an image of the image stream are extracted using an algorithm selected from the histogram of oriented gradient algorithm and normalised gradient analysis algorithm.

\* \* \* \* \*